(12) United States Patent
Sasaki et al.

(10) Patent No.: US 10,215,913 B2
(45) Date of Patent: *Feb. 26, 2019

(54) MULTICORE FIBER

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Yusuke Sasaki, Sakura (JP); Hitoshi Uemura, Sakura (JP); Kunimasa Saitoh, Sapporo (JP); Takeshi Fujisawa, Sapporo (JP)

(73) Assignees: FUJIKURA LTD., Tokyo (JP); NATIONAL UNIVERSITY CORPORATION HOKKAIDO UNIVERSITY, Sapporo-shi, Hokkaido (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,786

(22) Filed: Feb. 2, 2017

(65) Prior Publication Data

US 2017/0235042 A1   Aug. 17, 2017

(30) Foreign Application Priority Data

Feb. 12, 2016   (JP) ................ 2016-025262

(51) Int. Cl.
*G02B 6/36*  (2006.01)
*G02B 6/26*  (2006.01)
(Continued)

(52) U.S. Cl.
CPC ........... *G02B 6/02* (2013.01); *G02B 6/02042* (2013.01); *G02B 6/02023* (2013.01)

(58) Field of Classification Search
CPC ............ G02B 6/02042; G02B 6/02023; C03B 2203/34
(Continued)

(56) References Cited

U.S. PATENT DOCUMENTS

| 6,360,046 B1* | 3/2002 | Sasaoka ............. G02B 6/02014 385/124 |
| 7,400,807 B2* | 7/2008 | Minelly ............. G02B 6/03605 359/341.1 |

(Continued)

FOREIGN PATENT DOCUMENTS

| JP | 2013-037017 A | 2/2013 |
| JP | 2014509410 A | 4/2014 |
| WO | 2015-129775 A1 | 9/2015 |

OTHER PUBLICATIONS

"Characterization of high order modes in optical fibers" by Ma, PhD thesis, 2009.*

(Continued)

*Primary Examiner* — Robert Tavlykaev
(74) *Attorney, Agent, or Firm* — Westerman, Hattori, Daniels & Adrian, LLP

(57) ABSTRACT

A multicore fiber includes: a first core configured to propagate an $LP_{01}$ mode, an $LP_{11}$ mode, and an $LP_{21}$ mode light beam; and a second core configured to propagate an $LP_{01}$ mode light beam, wherein a different mode interaction section is provided in which a propagation constant of the $LP_{21}$ mode light beam propagated through the first core is matched with a propagation constant of the $LP_{01}$ mode light beam propagated through the second core, a different mode non-interaction section is provided in which propagation constants of the LP mode light beams propagated through the first core are not matched with propagation constants of the LP mode light beams propagated through the second core, and the first core includes an inner core and an outer (Continued)

core surrounding the inner core with no gap and having a refractive index higher than a refractive index of the inner core.

11 Claims, 13 Drawing Sheets

(51) Int. Cl.
*G02B 6/42* (2006.01)
*G02B 6/02* (2006.01)

(58) Field of Classification Search
USPC ................................. 385/28, 30, 123, 126
See application file for complete search history.

(56) References Cited

U.S. PATENT DOCUMENTS

| | | | | |
|---|---|---|---|---|
| 8,068,705 B2* | 11/2011 | Gapontsev | ......... | G02B 6/03611 385/28 |
| 2005/0013572 A1* | 1/2005 | Guan | ................ | G02B 6/02261 385/127 |
| 2006/0171648 A1* | 8/2006 | Hasegawa | .......... | G02B 6/03644 385/127 |
| 2008/0069506 A1* | 3/2008 | DiGiovanni | ....... | G02B 6/02009 385/123 |
| 2012/0183304 A1* | 7/2012 | Winzer | ............. | G02B 6/02042 398/142 |
| 2014/0064687 A1* | 3/2014 | Hoover | ............. | G02B 6/03644 385/126 |
| 2014/0093205 A1* | 4/2014 | Gruner-Nielsen | ... | G02B 6/0288 385/43 |
| 2014/0153883 A1* | 6/2014 | Mukasa | ............. | G02B 6/02042 385/100 |
| 2015/0086157 A1* | 3/2015 | Fontaine | .................. | G02B 6/14 385/28 |
| 2015/0160408 A1* | 6/2015 | Bickham | ............ | G02B 6/02042 385/124 |
| 2015/0226914 A1* | 8/2015 | Hirano | ............... | G02B 6/02014 385/127 |
| 2015/0226915 A1* | 8/2015 | Kawaguchi | ........ | G02B 6/03627 385/124 |
| 2016/0043525 A1* | 2/2016 | Ichige | .................. | H01S 3/0672 359/341.32 |
| 2016/0137344 A1 | 5/2016 | Tamura et al. | | |
| 2016/0187577 A1 | 6/2016 | Sasaki et al. | | |

OTHER PUBLICATIONS

"Multicore fiber-based mode multiplexer-demultiplexer" by Sasaki et al, Proceedings of SPIE, vol. 9389, Feb. 7, 2015.*
"Few-core spatial-mode multiplexers/demultiplexers based on evanescent coupling" by Riesen et al, IEEE Photonics Technology Letters, vol. 25, No. 14, pp. 1324-1327, 2013.*
"Mode multiplexer/demultiplexer based on a partially elongated multi-core fiber" by Uemura et al, paper Tu3D.3 OFC 2014.*
Li et al., "Low-Loss Fused Mode Coupler for Few-Mode Transmission", OFC/NFOEC Technical Digest, OTu3G4, 2013, (3 pages).
Office Action dated Oct. 17, 2017, issued in counterpart Japanese application No. 2016-025262, with English Translation. (7 pages).
Nishimoto S. et al., Design of 5 mode multi/demultiplexer based on fused type multicore fiber coupler, The Institute of Electronics, Information and Communication Engineers, Feb. 11, 2016, vol. 115, No. 452, pp. 95-100.

* cited by examiner

FIG. 2A 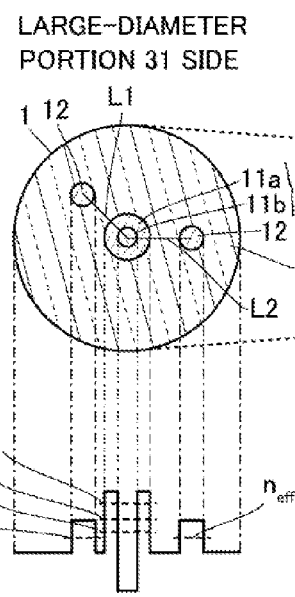 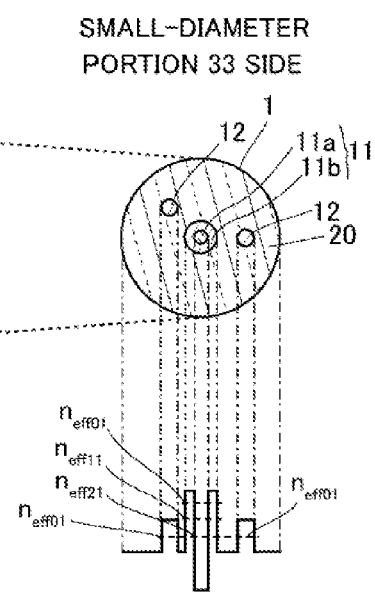
FIG. 2B d/2r₁=0.36 r₃=4.39 μm $r_3=4.40\,\mu\text{m}$ $r_3=4.41\,\mu\text{m}$ $r_2$=4.51 μm $r_2$=4.52 μm $r_2$=4.53 μm $\Lambda_2$=22.5 μm $\Lambda_2$=23.0 μm

MULTICORE FIBER

BACKGROUND OF THE INVENTION

The present invention relates to a multicore fiber that is preferable to the case of multiplexing and demultiplexing light beams in different modes.

In optical communications using optical fibers, multimode communications are known, in which information is superposed on a light beam in the $LP_{01}$ mode (the fundamental mode) as well as information is superposed on LP mode light beams higher than the fundamental mode, such as the $LP_{11}$ mode for information communications. In multimode communications, a plurality of LP mode light beams propagated through one core is demultiplexed to a plurality of optical fibers, or LP mode light beams different from each other, which are propagate through a plurality of optical fibers, are multiplexed on one optical fiber.

Non-Patent Literature 1 below describes that in the case in which the same LP mode light beams are propagated through a set of optical fibers, the modes of the light beams propagated through the optical fibers are converted into LP modes different from each other, and then the light beams are multiplexed with each other.

A mode multiplexer/demultiplexer described in Patent Literature 1 below has two waveguides. In these waveguides, a first waveguide propagates specific LP mode light beams, and a second waveguide propagates one of the specific LP mode light beams and an LP mode light beam different from that one of the specific LP mode light beam. In the case in which these waveguides propagate the same specific LP mode light beams, the propagation constant of that one of the specific LP mode light beams in the first waveguide is matched with the propagation constant of the LP mode light beam different from that one in the second waveguide. With this configuration, the specific LP mode light beam in the first waveguide is multiplexed as the different LP mode light beam in the second waveguide. The second waveguide originally propagates the specific LP mode light beam. Consequently, the second waveguide propagates the original specific LP mode light beam and the specific LP mode light beam having been propagated through the first waveguide. Thus, with no use of any mode converter, in the case in which the same LP mode light beams are propagated through a plurality of optical waveguides, these light beams can be propagated through one waveguide as in light beams in different modes.

[Non-Patent Literature 1] An Li et al., "Low-Loss Fused Mode Coupler for Few-Mode Transmission", OFC, OTu3G4 (2013)

[Patent Literature 1] JP-A-2013-37017

SUMMARY OF THE INVENTION

The mode multiplexer/demultiplexer described in Non-Patent Literature 1 needs a mode converter. In the mode multiplexer/demultiplexer described in Patent Literature 1, waveguides are disposed close to each other on a site for mode multiplexing and demultiplexing in order to take place mode multiplexing and demultiplexing, whereas on sites other than this site, waveguides are disposed apart from each other in order not to take place mode multiplexing and demultiplexing. Therefore, the mode multiplexer/demultiplexer described in Non-Patent Literature 1 needs the site to dispose a mode converter. The mode multiplexer/demultiplexer described in Patent Literature 1 needs the sites where the waveguides are disposed apart from each other, at which mode multiplexing and demultiplexing is not taken place.

Therefore, an object of the present invention is to implement a downsizable mode multiplexer/demultiplexer using a multicore fiber.

To solve the problem, a multicore fiber of the present invention includes: a first core configured to propagate an $LP_{01}$ mode light beam, an $LP_{11}$ mode light beam, and an $LP_{21}$ mode light beam; and a second core configured to propagate an $LP_{01}$ mode light beam, wherein a different mode interaction section is provided in which a propagation constant of the $LP_{21}$ mode light beam propagated through the first core is matched with a propagation constant of the $LP_{01}$ mode light beam propagated through the second core, a different mode non-interaction section is provided in which propagation constants of the LP mode light beams propagated through the first core are not matched with propagation constants of the LP mode light beams propagated through the second core, and the first core includes an inner core and an outer core surrounding the inner core with no gap and having a refractive index higher than a refractive index of the inner core.

In a so-called step index fiber in which the refractive index of the core is almost constant in the radial direction and a graded index fiber in which the refractive index of the core is gradually increased from the outer circumferential part to the center, the difference between the effective refractive index of the $LP_{21}$ mode light beam and the effective refractive index of the $LP_{02}$ mode light beam is small. Thus, it is difficult to cut only any one of the $LP_{21}$ mode light beam and the $LP_{02}$ mode light beam off. On the other hand, the first core of the multicore fiber is a so-called ring index core including an inner core and an outer core having a refractive index higher than the refractive index of the inner core. The first core is such a ring index core. Thus, in the first core, the difference between the effective refractive index of the $LP_{21}$ mode light beam and the effective refractive index of the $LP_{02}$ mode light beam can be increased. Consequently, with the appropriate design of the refractive index of the inner core and the refractive index of the outer core, the first core can propagate the $LP_{21}$ mode light beam as well as can reduce the propagation of the $LP_{02}$ mode light beam. In the case in which the $LP_{01}$ mode, the $LP_{11}$ mode, and the $LP_{21}$ mode light beams are transmitted from the multicore fiber to a transmission fiber, the excitation of the $LP_{02}$ mode light beam is reduced in the first core, allowing optical losses caused by coupling the $LP_{02}$ mode light beam to be made smaller.

In the different mode interaction section of this multicore fiber, the propagation constant of the $LP_{01}$ mode light beam propagated through the second core is matched with the propagation constant of the $LP_{21}$ mode light beam propagated through the first core. Thus, in the different mode interaction section, the $LP_{01}$ mode light beam propagated through the second core can be mode-multiplexed as the $LP_{21}$ mode light beam propagated through the first core, or the $LP_{21}$ mode light beam propagated through the first core can be mode-demultiplexed as the $LP_{01}$ mode light beam propagated through the second core.

In the different mode non-interaction section of this multicore fiber, the propagation constants of the LP mode light beams propagated through the second core are not matched with the propagation constants of the LP mode light beams propagated through the first core. Consequently, in the different mode non-interaction section, the occurrence of mode multiplexing and demultiplexing can be reduced without separating the first core from the second core as in Patent Literature 2.

Thus, according to this multicore fiber, a downsizable mode multiplexer/demultiplexer can be achieved.

The multicore fiber preferably includes two cores of the second cores. A first one of the second cores is disposed at a position overlapped with a first line segment extending from a center of the first core, and a second one of the second cores is disposed at a position overlapped with a second line segment crossing the first line segment at an angle of 135 degrees in the center of the first core.

The $LP_{21}$ mode light beam is formed of light beams in two different modes ($LP_{21}a$ and $LP_{21}b$ light beams) including four nodes in the relationship in which the sites having the strongest intensity are rotated at an angle of 45 degrees+an angle of 90 degrees×n (n is an integer in a range of zero to three). The two second cores are disposed in the relationship in which they are rotated at an angle of 45 degrees+an angle of 90 degrees×n turns as the first core is the center. Thus, in the different mode interaction section, the $LP_{21}a$ mode light beam propagated through the first core can be mode-demultiplexed as the $LP_{01}$ mode light beam propagated through the first one of the second cores as well as the $LP_{21}b$ mode light beam propagated through the first core can be mode-demultiplexed as the $LP_{01}$ mode light beam propagated through the second one of the second cores. In the different mode interaction section, the $LP_{01}$ mode light beam propagated through the first one of the second cores can be mode-multiplexed as the $LP_{21}a$ mode light beam propagated through the first core as well as the $LP_{01}$ mode light beam propagated through the second one of the second cores can be mode-multiplexed as the $LP_{21}b$ mode light beam propagated through the first core. In mode multiplexing and demultiplexing, when the two second cores are disposed at positions at which they are rotated at an angle of 135 degrees as the first core is the center, the gap between the two second cores can be increased, compared with the case in which the two second cores are disposed at positions at which they are rotated at an angle of 45 degrees as the first core is the center. Thus, the crosstalk between the light beam propagated through the first one of the second cores and the light beam propagated through the second one of the second cores is easily reduced. Consequently, the first one of the second cores is disposed at the position overlapped with the first line segment extending from the center of the first core, and the second one of the second cores is disposed at the position overlapped with the second line segment crossing the first line segment at an angle of 135 degrees in the center of the first core. Accordingly, the crosstalk between the light beam propagated through the first one of the second cores and the light beam propagated through the second one of the second cores is easily reduced.

The multicore fiber preferably includes a third core configured to propagate an $LP_{01}$ mode light beam. In the different mode interaction section, the propagation constant of the $LP_{11}$ mode light beam propagated through the first core is matched with a propagation constant of an $LP_{01}$ mode light beam propagated through the third core. In the different mode non-interaction section, the propagation constants of the LP mode light beams propagated through the first core are not matched with propagation constants of LP mode light beams propagated through the third core.

The third core is provided. Thus, in the different mode interaction section, the $LP_{01}$ mode light beam propagated through the third core can be mode-multiplexed as the $LP_{11}$ mode light beam propagated through the first core, or the $LP_{11}$ mode light beam propagated through the first core can be mode-demultiplexed as the $LP_{01}$ mode light beam propagated through the third core. Consequently, information can be superposed on the $LP_{01}$ mode light beam, the $LP_{11}$ mode light beam, and the $LP_{21}$ mode light beam. Accordingly, optical communications with a larger amount of information can be performed.

The multicore fiber preferably includes two cores of the third core. A first one of the third cores is disposed at a position overlapped with a third line segment extending from the center of the first core and a second one of the third cores is disposed at a position overlapped with a fourth line segment crossing the third line segment at an angle of 90 degrees in the center of the first core.

The $LP_{11}$ mode light beam is formed of light beams in two different modes ($LP_{11}a$ and $LP_{11}b$) in the relationship in which the sites having the strongest intensity are rotated at an angle of 90 degrees. The two third cores are disposed in the relationship in which they are rotated at an angle of 90 degrees as the first core is the center. Thus, in the different mode interaction section, the $LP_{11}a$ mode light beam propagated through the first core can be mode-demultiplexed as the $LP_{01}$ mode light beam propagated through the first one of the third cores, as well as the $LP_{11}b$ mode light beam propagated through the first core can be mode-demultiplexed as the $LP_{01}$ mode light beam propagated through the second one of the third cores. In the different mode interaction section, the $LP_{01}$ mode light beam propagated through the first one of the third cores can be mode-multiplexed as the $LP_{11}a$ mode light beam propagated through the first core, as well as the $LP_{01}$ mode light beam propagated through the second one of the third cores can be mode-multiplexed as the $LP_{11}b$ mode light beam propagated through the first core. Consequently, information can also be superposed on the $LP_{11}a$ mode light beam and the $LP_{11}b$ mode light beam. Accordingly, optical communications with a larger amount of information can be performed.

In the case in which two cores of the second core and two cores of the third core are provided, preferably, a first one of the second cores is disposed at a position overlapped with a first line segment extending from a center of the first core, and a second one of the second cores is disposed at a position overlapped with a second line segment crossing the first line segment at an angle of 135 degrees in the center of the first core. A first one of the third cores is disposed at a position overlapped with a third line segment extending from the center of the first core and a second one of the third cores is disposed at a position overlapped with a fourth line segment crossing the third line segment at an angle of 90 degrees in the center of the first core. The first line segment crosses the third line segment at an angle of 67.5 degrees in the center of the first core. The second line segment crosses the fourth line segment at an angle of 67.5 degrees in the center of the first core.

The two second cores and the two third cores are disposed as described above, causing the two second cores and the two third cores to be disposed apart from each other. Accordingly, the crosstalk between light beams propagated through the cores is easily reduced.

In the case in which the multicore fiber further includes a third core configured to propagate an $LP_{01}$ mode light beam, preferably, the first core, the second core, and the third core are disposed at positions overlapped with one straight line so that the first core is disposed between the second core and the third core.

In the case in which any one of the $LP_{11}a$ mode light beam and the $LP_{11}b$ mode light beam and any one of the $LP_{21}a$ mode light beam and the $LP_{21}b$ mode light beam are used, as described above, the second core and the third core may be provided one each. The first core, the second core, and the third core are disposed on a straight line. Thus, the core pitch between them is increased, and the crosstalk is easily reduced.

The first core may be located in a center of a cladding.

The different mode interaction section is preferably formed by stretching a part of the different mode non-interaction section.

The different mode interaction section is formed in this manner. Thus, the structure of the multicore fiber in a cross section in the different mode interaction section and the structure of the multicore fiber in a cross section in the different mode non-interaction section are in similar relationships. Consequently, the correlation between the propagation constant of the light beam in the different mode interaction section and the propagation constant of the light beam in the different mode non-interaction section is easily calculated. The different mode interaction section is formed by stretching. Accordingly, the different mode interaction section can be formed by easily stretching the multicore fiber using a heater having a small energy, such as a fusion splicer.

Numbers of LP mode light beams propagated through the first core, the second core, and the third core in a use wavelength range are preferably not changed in the different mode interaction section and in the different mode non-interaction section.

The propagation constants are not changed in the sections.

Thus, it is eliminated that the excitation of unnecessary LP mode light beams is taken into account, and light beams can be efficiently handled.

As described above, according to the present invention, it is possible to implement a downsizable mode multiplexer/demultiplexer using a multicore fiber.

BRIEF DESCRIPTION OF THE DRAWINGS

FIGS. 2A and 2B are diagrams of cross sections perpendicular to the longitudinal direction in the large-diameter portion and the small-diameter portion of the multicore fiber in FIG. 1, in which in the small-diameter portion, core pitches do not look small;

DETAILED DESCRIPTION OF THE INVENTION

Figure 1:
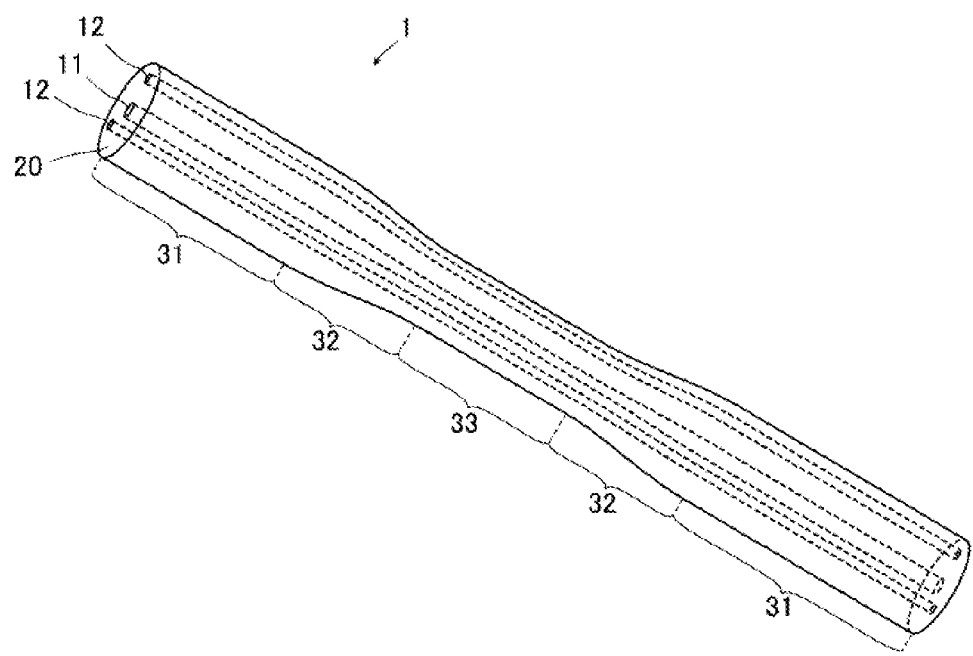
FIG. 1 is a diagram of a multicore fiber according to a first embodiment.

In the following, preferred embodiments of a multicore fiber according to the present invention will be described in detail with reference to the drawings. Note that, for easy understanding, scales described in the drawings are sometimes different from scales in the following description.

First Embodiment

FIG. 1 is a diagram of a multicore fiber according to a first embodiment of the present invention. As illustrated in FIG. 1, a multicore fiber 1 according to the embodiment includes one first core 11, two second cores 12, and a cladding 20 surrounding the outer circumferential surfaces of the first core 11 and the second cores 12 with no gap. The two second cores 12 have configurations similar to each other except the dispositions.

The multicore fiber 1 is formed with a large-diameter portion 31, a tapered portion 32, and a small-diameter portion 33 along the longitudinal direction. The tapered portion 32 and the small-diameter portion 33 are formed by heating and stretching a part of the large-diameter portion 31. The stretching by such heating may be heating using an oxyhydrogen burner. However, this stretching can be sufficiently performed by heating caused by electric discharge. For example, a fusion splicer for optical fibers using arc discharge is practically available. Alternatively, this arc discharge may be used as a heat source for stretching. A fiber is stretched by heating using arc discharge in a closed space, easily allowing the fiber to be constantly molten. With the use of an stretching function having a combination of the motor of the fusion splicer and image analysis in stretching the fiber, allowing the multicore fiber 1 to be highly accurately stretched.

FIGS. 2A and 2B are diagrams of cross sections of the large-diameter portion 31 and the small-diameter portion 33 of the multicore fiber 1 perpendicular to the longitudinal direction. Specifically, FIG. 2A is the structure of the large-diameter portion 31 and the small-diameter portion 33 in a cross section, and FIG. 2B is the refractive index profiles of the large-diameter portion 31 and the small-diameter portion 33 in a cross section.

As illustrated in FIG. 2A, the first core 11 has an inner core 11a and an outer core 11b surrounding the outer circumferential surface of the inner core 11a with no gap. The first core 11 is located in the center of the cladding 20. In the two second cores 12, a first one of the second cores 12 is disposed at a position overlapped with a first line segment L1 extending from the center of the first core 11, and a second one of the second cores 12 is disposed at a position overlapped with a second line segment L2 crossing the first line segment L1 in the center of the first core 11 at an angle of 135 degrees. As described above, the small-diameter portion 33 is formed by stretching the large-diameter portion 31. Thus, the ratio of the outer diameter of the cladding 20 to the diameter of the first core 11 and the diameter of the second core 12 does not change at any locations in the multicore fiber 1. Consequently, the diameter of the first core 11 in the small-diameter portion 33 is smaller than the diameter of the first core 11 in the large-diameter portion 31, and the diameter of the second core 12 in the small-diameter portion 33 is smaller than the diameter of the second core 12 in the large-diameter portion 31.

In FIG. 2B, solid lines express the refractive index profiles of the multicore fiber 1. As illustrated in FIG. 2B, the refractive index of the outer core 11b is higher than the refractive index of the inner core 11a and the refractive index of the cladding 20. The refractive index of the inner core 11a is lower than the refractive index of the cladding 20. The refractive index of the second core 12 is higher than the refractive index of the cladding 20. These refractive indexes are constant along the longitudinal direction of the multicore fiber 1.

In FIG. 2B, broken lines express the effective refractive indexes $n_{eff}$ of LP mode light beams propagated through the first core 11 and the second core 12. The first core 11 is a few-mode core that propagates an $LP_{01}$ mode light beam, an $LP_{11}$ mode light beam, and an $LP_{21}$ mode light beam and reduces the propagation of LP mode light beams higher than these modes. The second core 12 is a single-mode core that propagates the $LP_{01}$ mode light beam and reduces the propagation of the $LP_{11}$ mode light beam.

In the large-diameter portion 31, the propagation constants of the LP mode light beams propagated through the first core 11 are not matched with the propagation constant of the $LP_{01}$ mode light beam propagated through the second core 12. The propagation constant corresponds to the effective refractive index $n_{eff}$. Consequently, in the embodiment, the effective refractive index $n_{eff01}$ of the $LP_{01}$ mode light beam, the effective refractive index $n_{eff11}$ of the $LP_{11}$ mode light beam, and the effective refractive index $n_{eff21}$ of the $LP_{21}$ mode light beam propagated through the first core 11 in the large-diameter portion 31 are not matched with the effective refractive index $n_{eff01}$ of the $LP_{01}$ mode light beam propagated through the second core 12. Thus, in the large-diameter portion 31, the crosstalk between the LP mode light beams propagate through the first core 11 and the $LP_{01}$ mode light beam propagate through the second core 12 is reduced. Accordingly, in the large-diameter portion 31, the occurrence of multiplexing and demultiplexing different mode light beams is reduced, and the large-diameter portion 31 is a different mode non-interaction section.

On the other hand, as described above, in the small-diameter portion 33, the diameters of the cores are different from the diameters of the respective cores in the large-diameter portion 31. Thus, the effective refractive index $n_{eff}$ in the small-diameter portion 33 is different from the effective refractive index $n_{eff}$ in the large-diameter portion 31. In the small-diameter portion 33, the effective refractive index $n_{eff21}$ of the $LP_{21}$ mode light beam propagated though the first core 11 is matched with the effective refractive index $n_{eff01}$ of the $LP_{01}$ mode light beam propagated through the second core 12. In other words, the propagation constant of the $LP_{21}$ mode light beam propagated through the first core 11 is matched with the propagation constant of the $LP_{01}$ mode light beam propagated through the second core 12. Because of this, in the small-diameter portion 33, crosstalk occurs between the $LP_{21}$ mode light beam propagate through the first core 11 and the $LP_{01}$ mode light beam propagate through the second core 12. Consequently, in the small-diameter portion 33, mode multiplexing and demultiplexing occurs between the $LP_{21}$ mode light beam propagate through the first core 11 and the $LP_{01}$ mode light beam propagate through the second core 12. Thus, the small-diameter portion 33 is a different mode interaction section.

The numbers of LP mode light beams propagated through the cores in the use wavelength range may be changed in the large-diameter portion 31 and in the small-diameter portion 33. However, the numbers are preferably unchanged. Thus, in the embodiment, preferably, in both of the large-diameter portion 31 and the small-diameter portion 33, the first core 11 propagates the $LP_{01}$ mode, the $LP_{11}$ mode, and the $LP_{21}$ mode light beams as well as reduces the propagation of LP mode light beams higher than these modes, and the second core 12 propagates the $LP_{01}$ mode light beam and reduces the propagation of the $LP_{11}$ mode light beam.

In the multicore fiber 1 according to the embodiment, when the $LP_{01}$ mode light beam is entered to the first core 11 and the second cores 12, in the small-diameter portion 33, the $LP_{01}$ mode light beam propagated through the second core 12 is multiplexed on the first core 11 as the $LP_{21}$ mode light beam. Alternatively, in the case in which a light beam formed of the $LP_{01}$ mode, the $LP_{11}$ mode, and the $LP_{21}$ mode light beams is entered to the first core 11 and no light beams are entered to the second cores 12, in the small-diameter portion 33, the $LP_{21}$ mode light beam propagated through the first core 11 is demultiplexed to the second cores 12 as the $LP_{01}$ mode light beam. In this manner, mode multiplexing and demultiplexing is achieved.

Here, multiplexing and demultiplexing the $LP_{21}$ mode light beam propagated through the first core 11 with the $LP_{01}$ mode light beam propagated through the two second cores 12 will be described in more detail.

In four regions divided by two straight lines that are perpendicular to each other, pass the center of the core, and extend in the radial direction, the $LP_{21}$ mode light beam propagated through the core has electric field distributions in regions adjacent to each other. The electric field distributions have inverted polarities, i.e. positive and negative polarities, and have the same energy distributions in the adjacent regions. Thus, when the $LP_{21}$ mode light beam is rotated at an angle of 90 degrees based on the center of the core through which the $LP_{21}$ mode light beam is propagated, the $LP_{21}$ mode light beam has the same energy distribution before rotated, whereas when the $LP_{21}$ mode light beam is rotated at an angle other than an angle of 90 degrees, its energy distribution is different from one before rotated. The $LP_{21}$ mode light beam is still referred to as the $LP_{21}$ mode light beam even though two $LP_{21}$ mode light beams are multiplexed with each other, which are in the relationship in which they are rotated at an angle of 45 degrees+90n degrees (n is an integer of zero or greater), such as at an angle of 45 degrees or an angle of 135 degrees.

Therefore, for example, one of two $LP_{21}$ mode light beams in the relationship in which they are rotated at an angle of 45 degrees+90n degrees (n is an integer of zero or greater) is defined as an $LP_{21}a$ mode light beam, the other is defined as an $LP_{21}b$ mode light beam, and the $LP_{21}$ mode light beam propagate through the first core 11 is the total of the $LP_{21}a$ mode light beam and the $LP_{21}b$ mode light beam. Under the conditions, the case is assumed in which the $LP_{21}$ mode light beam propagate through the first core 11 is mode-demultiplexed to $LP_{01}$ mode light beams propagated through the second cores 12. In this case, a tendency is observed, in which the $LP_{21}a$ mode light beam is superposed on the $LP_{01}$ mode light beam propagated through a first one of the second cores 12 and the $LP_{21}b$ mode light beam is demultiplexed to the $LP_{01}$ mode light beam propagated through a second one of the second cores 12. The case is assumed in which $LP_{01}$ mode light beams propagated through two second cores 12 are mode-multiplexed with an $LP_{21}$ mode light beam propagated through a first core 11. In this case, a tendency is observed, in which the light beam propagated through a first one of the second cores 12 is multiplexed with one of the $LP_{21}a$ mode light beam and the $LP_{21}b$ mode light beam propagate through the first core 11 and the light beam propagated through a second one of the second cores 12 is multiplexed with the other of the $LP_{21}a$ mode light beam and the $LP_{21}b$ mode light beam propagate through the first core 11.

Thus, according to the multicore fiber 1 of the embodiment, information can be superposed on the $LP_{01}$ mode light beam, the $LP_{21}a$ mode light beam, and the $LP_{21}b$ mode light beam propagate through the first core 11. Thus, optical communications with a larger amount of information can be performed.

Note that, in the multicore fiber 1 according to the embodiment, the second cores 12 are disposed on the line segments crossing at an angle of 135 degrees in the center of the first core 11. When the two second cores 12 are disposed at locations rotated at an angle of 135 degrees as the first core 11 is the center, the gap between the two second cores 12 can be increased, compared with the case in which two second cores 12 are disposed at the locations rotated at an angle of 45 degrees as the first core 11 is the center. Thus, the crosstalk between the light beam propagated through the first one of the second cores 12 and the light beam propagated through the second one of the second cores 12 is easily reduced.

As described above, mode multiplexing and demultiplexing is achieved in the small-diameter portion 33. However, in the large-diameter portion 31, the propagation constants of the LP mode light beams propagated through the first core 11 are not matched with the propagation constant of the $LP_{01}$ mode light beam propagated through the second core 12. Thus, the occurrence of such multiplexing and demultiplexing is reduced without providing a structure in which the first core 11 is disposed apart from the second cores 12. Consequently, according to the multicore fiber 1 of the embodiment, a downsizable mode multiplexer/demultiplexer can be achieved.

As described below, the first core 11 propagates the $LP_{21}$ mode light beam, and can reduce the propagation of an $LP_{02}$ mode light beam. In a so-called step index fiber, in which the refractive index of the core is almost constant in the radial direction and a graded index fiber, in which the refractive index of the core is gradually increased to the center, the difference between the effective refractive index of the $LP_{21}$ mode light beam and the effective refractive index of the $LP_{02}$ mode light beam is small. Thus, it is difficult to cut only any one of the $LP_{21}$ mode light beam and the $LP_{02}$ mode light beam off. On the other hand, the first core 11 of the multicore fiber 1 is a so-called ring index core including the inner core 11a and the outer core 11b having a refractive index higher than the refractive index of the inner core 11a. The first core 11 is a ring index core as described above. Thus, in the first core 11, the difference between the effective refractive index of the $LP_{21}$ mode light beam and the effective refractive index of the $LP_{02}$ mode light beam can be increased. Consequently, with the appropriate design of the refractive index of the inner core 11a and the refractive index of the outer core 11b, the first core 11 can propagate the $LP_{21}$ mode light beam as well as can reduce the propagation of the $LP_{02}$ mode light beam. In the case in which only the $LP_{01}$ mode, the $LP_{11}$ mode, and the $LP_{21}$ mode light beams are transmitted from the multicore fiber 1 to a transmission fiber, a reduction in excitation of the $LP_{02}$ mode light beam in the first core allows optical losses caused by coupling the $LP_{02}$ mode light beam to be made smaller.

Second Embodiment

Next, a second embodiment of the present invention will be described. Note that, components the same as or equivalent to the components of the first embodiment are designated the same reference numerals and signs, and the overlapping description is omitted unless otherwise specified.

Figure 3A:
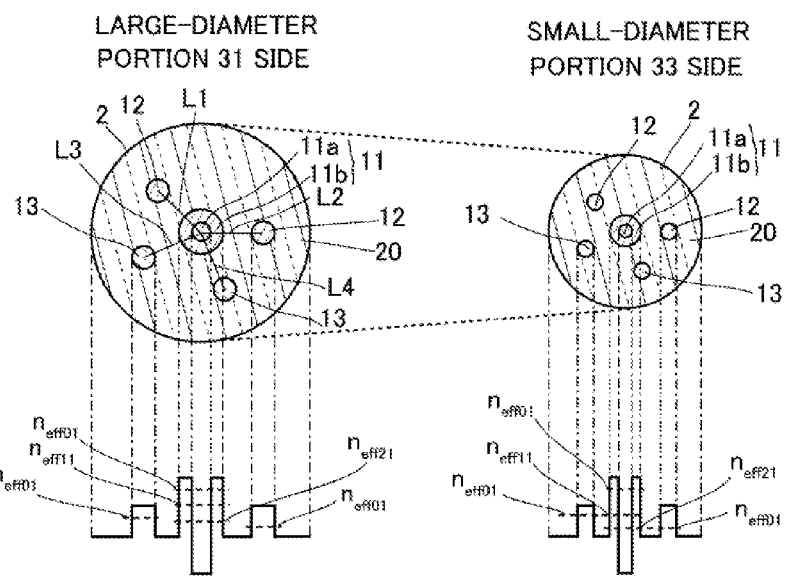
FIGS. 3A and 3B are diagrams of cross sections perpendicular to the longitudinal direction in the large-diameter portion and the small-diameter portion of a multicore fiber according to a second embodiment.
Figure 3B:
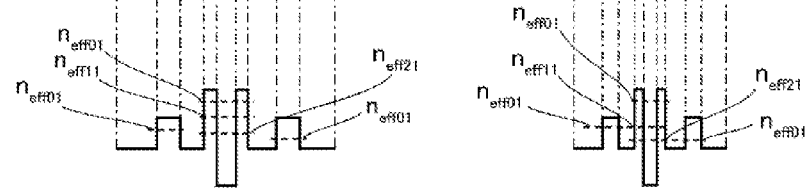

FIGS. 3A and 3B are diagrams of cross sections perpendicular to the longitudinal direction in the large-diameter portion and the small-diameter portion of a multicore fiber according to the second embodiment. Specifically, FIG. 3A illustrates the structure of a large-diameter portion 31 and a small-diameter portion 33 in a cross section, and FIG. 3B illustrates the refractive index profiles of the large-diameter portion 31 and the small-diameter portion 33 in a cross section.

A multicore fiber 2 according to the embodiment is different from the multicore fiber 1 according to the first embodiment in that two third cores 13 are further included. The two third cores 13 have similar configurations other than their dispositions. In the two third cores 13, a first one of the third cores 13 is disposed at a position overlapped with a third line segment L3 extending from the center of a first core 11, and a second one of the third cores 13 is disposed at a position overlapped with a fourth line segment L4 crossing the third line segment L3 at an angle of 90 degrees in the center of the first core 11.

The third core 13 propagates the $LP_{01}$ mode light beam. In the embodiment, in the small-diameter portion 33, the propagation constant of the $LP_{01}$ mode light beam propagated through the second core 12 is matched with the propagation constant of the $LP_{21}$ mode light beam propagated through the first core 11, and the propagation constant of the $LP_{01}$ mode light beam propagated through the third core 13 is matched with the propagation constant of the $LP_{11}$ mode light beam propagated through the first core 11. In other words, in the small-diameter portion 33, the effective refractive index $n_{eff01}$ of the $LP_{01}$ mode light beam propagated through the second core 12 is matched with the effective refractive index $n_{eff21}$ of the $LP_{21}$ mode light beam propagated through the first core 11, and the effective refractive index $n_{eff01}$ of the $LP_{01}$ mode light beam propagated through the third core 13 is matched with the effective refractive index $n_{eff11}$ of the $LP_{11}$ mode light beam propagated through the first core 11. In the large-diameter portion 31, the propagation constants of the LP mode light beams propagated through the first core 11 are not matched with the propagation constants of the LP mode light beams propagated through the second cores 12 and the third cores 13.

Thus, when the $LP_{01}$ mode light beam is entered to the first core 11, the second cores 12, and the third cores 13, in the small-diameter portion 33, the $LP_{01}$ mode light beam propagated through the second core 12 is multiplexed as the $LP_{21}$ mode light beam on the first core 11, and the $LP_{01}$ mode light beam propagated through the third core 13 is multiplexed as the $LP_{11}$ mode light beam on the first core 11. In the case in which the $LP_{01}$ mode, the $LP_{11}$ mode, and the $LP_{21}$ mode light beams are entered to the first core 11 and no light beams are entered to the second cores 12 and the third cores 13, in the small-diameter portion 33, the $LP_{21}$ light beam propagated through the first core 11 is demultiplexed as the $LP_{01}$ mode light beam to the second cores 12, and the $LP_{11}$ mode light beam propagated through the first core 11 is demultiplexed as the $LP_{01}$ mode light beam to the third core 13. In the large-diameter portion 31, the propagation constants of the LP mode light beams propagated through the first core 11 are not matched with the propagation constants of the LP mode light beams propagated through the second cores 12 and the third cores 13. Thus, the occurrence of mode multiplexing and demultiplexing among the first core 11, the second cores 12, and the third cores 13 is reduced.

Here, multiplexing and demultiplexing of the $LP_{11}$ mode light beam propagate through the first core 11 with the $LP_{01}$ mode light beam propagated through the third cores 13 will be described in more detail.

In the $LP_{11}$ mode light beam, which is propagated through the center of the core, based on a straight line passing the center of the core and extending in the radial direction, a positive electric field is distributed on one side, a negative electric field is distributed on the other side, and energy distributions are the same on the one side and the other side. Thus, when the $LP_{11}$ mode light beam is rotated at an angle of 180 degrees based on the center of the core, through which the $LP_{11}$ mode light beam is propagated, its energy distribution is the same as one before rotated, whereas the $LP_{11}$ mode light beam is rotated at an angle other than an angle of 180 degrees, its energy distribution is different from one before rotated. The $LP_{01}$ mode light beam is still referred to as the $LP_{11}$ mode light beam even though two $LP_{11}$ mode light beams are multiplexed with each other, which are in the relationship in which they are rotated at an angle of 90 degrees.

Therefore, one of two $LP_{11}$ mode light beam in the relationship in which they are rotated at an angle of 90 degrees is defined as an $LP_{11}a$ mode light beam, the other is defined as an $LP_{11}b$ mode light beam, and the $LP_{11}$ mode light beam propagate through the first core 11 is the total of the $LP_{11}a$ mode light beam and the $LP_{11}b$ mode light beam. Under these conditions, the case is assumed in which the $LP_{11}$ mode light beam propagate through the first core 11 is mode-demultiplexed to the $LP_{01}$ mode light beam propagated through the third cores 13. In this case, a tendency is observed, in which the $LP_{11}a$ mode light beam is demultiplexed to the $LP_{01}$ mode light beam propagated through a first one of the third cores 13 and the $LP_{11}b$ mode light beam is demultiplexed to the $LP_{01}$ mode light beam propagated through a second one of the third cores 13. The case is assumed in which the $LP_{01}$ mode light beams propagated through the two third cores 13 are mode-multiplexed with the $LP_{11}$ mode light beam propagated through the first core 11. In this case, a tendency is observed, in which the light beam propagated through the first one of the third cores 13 is multiplexed with one of the $LP_{11}a$ mode light beam and the $LP_{11}b$ mode light beam propagated through the first core 11, and the light beam propagated through the second one of the third cores 13 is multiplexed with the other of the $LP_{11}a$ mode light beam and the $LP_{11}b$ mode light beam propagated through the first core 11.

Thus, according to the multicore fiber 2 of the embodiment, information can be superposed on the $LP_{01}$ mode light beam, the $LP_{11}a$ mode light beam, the $LP_{11}b$ mode light beam, the $LP_{21}a$ mode light beam, and the $LP_{21}b$ mode light beam. Thus, optical communications with a larger amount of information can be performed.

In the multicore fiber 2 according to the embodiment, the first line segment L1 crosses the third line segment L3 at an angle of 67.5 degrees in the center of the first core 11, and the second line segment L2 crosses the fourth line segment L4 at an angle of 67.5 degrees in the center of the first core 11. The two second cores 12 and the two third cores 13 are disposed on these line segments. Thus, the two second cores 12 and the two third cores 13 are disposed apart from each other. Accordingly, the crosstalk between light beams propagated through the cores is easily reduced.

Note that, also in the embodiment, preferably, the numbers of the LP mode light beams propagated through the cores are not changed in the large-diameter portion 31 and in the small-diameter portion 33.

Third Embodiment

Next, according to a third embodiment of the present invention will be described. Note that, components the same as or equivalent to the components of the first and the second embodiments are designated the same reference numerals and signs, and the overlapping description is omitted unless otherwise specified.

Figure 4A:
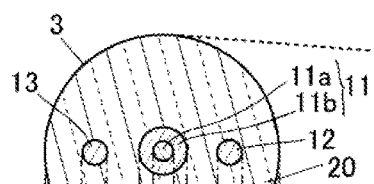
FIGS. 4A and 4B are diagrams of cross sections perpendicular to the longitudinal direction in the large-diameter portion and the small-diameter portion of a multicore fiber according to a third embodiment.
Figure 4A:
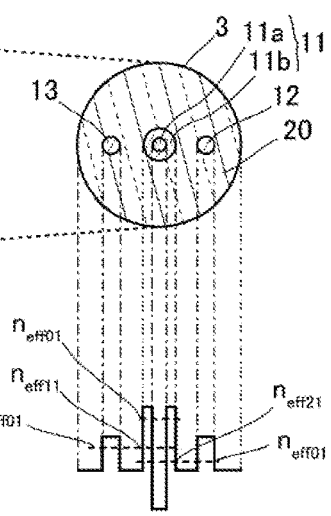
Figure 4B:
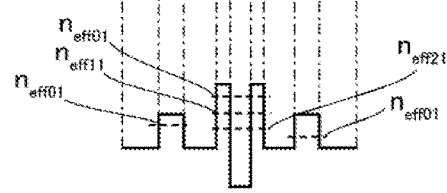
Figure 4B:
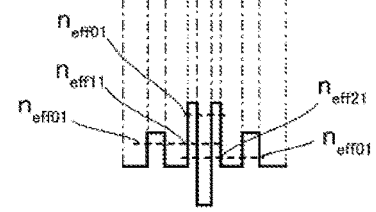

FIGS. 4A and 4B are diagrams of cross sections perpendicular to the longitudinal direction in the large-diameter portion and the small-diameter portion of a multicore fiber according to the third embodiment. Specifically, FIG. 4A illustrates the structure of a large-diameter portion 31 and a small-diameter portion 33 in a cross section, and FIG. 4B illustrates the refractive index profiles of the large-diameter portion 31 and the small-diameter portion 33 in a cross section.

A multicore fiber 3 according to the embodiment includes one second core 12 on one side based on the center of a first core 11 and one third core 13 on the opposite side of the second core 12. The first core 11 is disposed between the second core 12 and the third core. The first core 11, the second core 12, and the third core 13 are disposed being overlapped with one straight line. The second core 12 and the third core 13 according to the embodiment have configurations similar to the configuration of the second embodiment except that the numbers and the locations for disposing them are different. Thus, in the small-diameter portion 33, the propagation constant of the $LP_{01}$ mode light beam propagated through the second core 12 is matched with the propagation constant of the $LP_{21}$ mode light beam propagated through the first core 11, and the propagation constant of the $LP_{01}$ mode light beam propagated through the third core 13 is matched with the propagation constant of the $LP_{11}$ mode light beam propagated through the first core 11. In other words, in the small-diameter portion 33, the effective refractive index $n_{eff01}$ of the $LP_{01}$ mode light beam propagated through the second core 12 is matched with the effective refractive index $n_{eff21}$ of the $LP_{21}$ mode light beam propagated through the first core 11, and the effective refractive index $n_{eff01}$ of the $LP_{01}$ mode light beam propagated through the third core 13 is matched with the effective refractive index $n_{\it{eff}11}$ of the $LP_{11}$ mode light beam propagated through the first core 11. In the configuration of the large-diameter portion 31, the propagation constants of the LP mode light beams propagated through the first core 11 are not matched with the propagation constants of the LP mode light beams propagated through the second cores 12 and the third cores 13.

In the multicore fiber 3 thus configured, when the $LP_{01}$ mode light beam is entered to the first core 11, the second core 12, and the third core 13, in the small-diameter portion 33, the $LP_{01}$ mode light beam propagated through the second core 12 is multiplexed as the $LP_{21}$ mode light beam on the first core 11, and the $LP_{01}$ mode light beam propagated through the third core 13 is multiplexed as the $LP_{11}$ mode light beam on the first core 11. In the case in which a light beam formed of the $LP_{01}$ mode, the $LP_{11}$ mode, and the $LP_{21}$ mode light beams is entered to the first core 11 and no light beams are entered to the second core 12 and the third core 13, in the small-diameter portion 33, the $LP_{21}$ mode light beam propagated through the first core 11 is demultiplexed as the $LP_{01}$ mode light beam to the second core 12, and the $LP_{11}$ mode light beam propagated through the first core 11 is demultiplexed as the $LP_{01}$ mode light beam to the third core 13. In the large-diameter portion 31, the propagation constants of the LP mode light beams propagated through the first core 11 are not matched with the propagation constants of the LP mode light beams propagated through the second cores 12 and the third cores 13. Thus, the occurrence of mode multiplexing and demultiplexing among the first core 11, the second core 12, and the third core 13 is reduced.

In the case in which any one of the $LP_{11}a$ mode light beam and the $LP_{11}b$ mode light beam and any one of the $LP_{21}a$ mode light beam and the $LP_{21}b$ mode light beam are used, the second core 12 and the third core 13 only have to be provided one each as in the embodiment. The first core 11, the second core 12, and the third core 13 are disposed on the straight line as in the embodiment. Thus, this increases the core pitch between them, and the crosstalk is easily reduced. In the case of the embodiment, the inter-mode crosstalk between the $LP_{01}$ mode light beam and the $LP_{11}$ mode light beam, the inter-mode crosstalk between the $LP_{11}$ mode light beam and the $LP_{21}$ mode light beam, and the inter-mode crosstalk between the $LP_{01}$ mode light beam and the $LP_{21}$ mode light beam are small. Consequently, even at the reception terminal of a transmission cable using a transmission fiber through which only the $LP_{01}$ mode, the $LP_{11}$ mode, and the $LP_{21}$ mode light beam are propagated, mode coupling compensation is unnecessary, and even a simple system can achieve multimode communications.

Note that, also in the embodiment, preferably, the numbers of the LP mode light beams propagated the cores are not changed in the large-diameter portion 31 and in the small-diameter portion 33.

As described above, the present invention is described as the embodiments are taken as examples. However, the present invention is not limited to these embodiments.

In the first to the third embodiments, examples are taken and described in which the second core 12 and the third core 13 propagate only the $LP_{01}$ mode. However, the second core 12 and the third core 13 may also propagate the $LP_{11}$ mode light beam.

In the first and the second embodiments, examples are taken and described in which two second cores 12 are provided. However, one second core 12 may be provided. In the second embodiment, an example is taken and described in which two third cores 13 are provided. However, one third core 13 may be provided.

In the first embodiment, an example is taken and described in which an angle formed by the line segment L1 and the line segment L2 is an angle of 135 degrees. However, the angle only has to be an angle of 45 degrees+ 90n degrees (n is an integer of zero or greater).

In the second embodiment, an example is taken and described in which an angle formed by the line segment L1 and the line segment L3 and an angle formed by the line segment L2 and the line segment L4 are an angle of 67.5 degrees. However, these angles are not limited to this angle.

In the examples, the first core 11 is located in the center of the cladding 20. However, the first core 11 may not be located in the center of the cladding 20.

EXAMPLES

In the following, the present invention will be described more in detail with reference to examples. However, the present invention is not limited to the examples below.

Example 1

In Example 1, the design of a multicore fiber corresponding to the multicore fiber 3 according to the third embodiment was investigated.

Design of First Core

The first core 11 propagates the $LP_{01}$ mode, the $LP_{11}$ mode, and the $LP_{21}$ mode light beams, and reduces the propagation of LP mode light beams higher than these modes. The conditions for the design of the function of the first core 11 were investigated as below.

Figure 5:
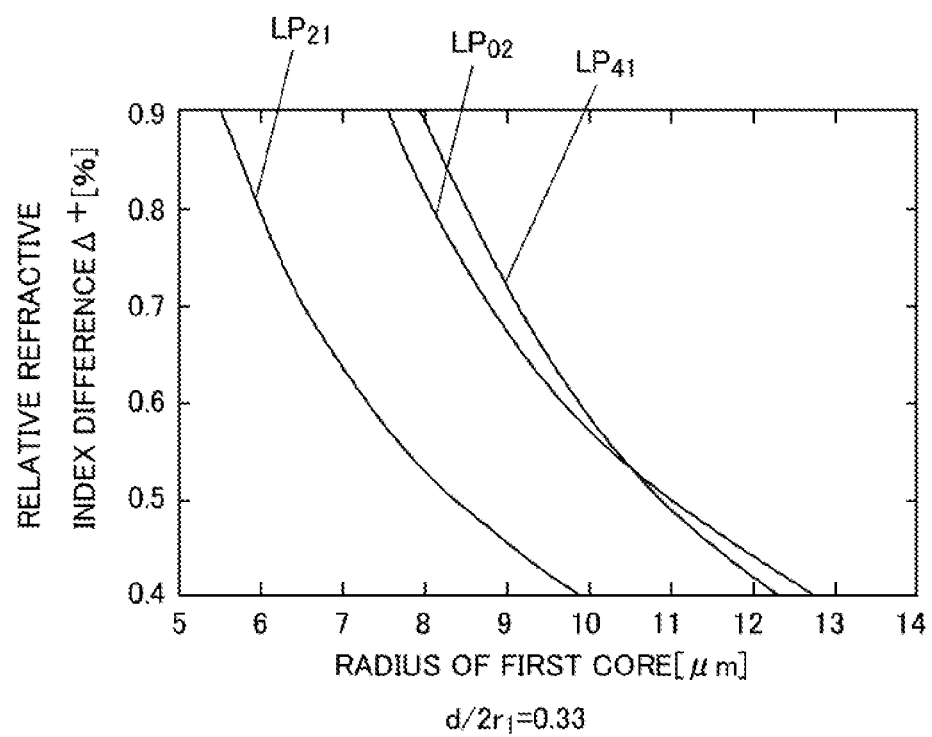
FIG. 5 is a diagram of the conditions in which in LP mode light beams are propagated through a first core in the case in which the ratio of the diameter of an inner core to the diameter of an outer core is 0.33.
Figure 6:
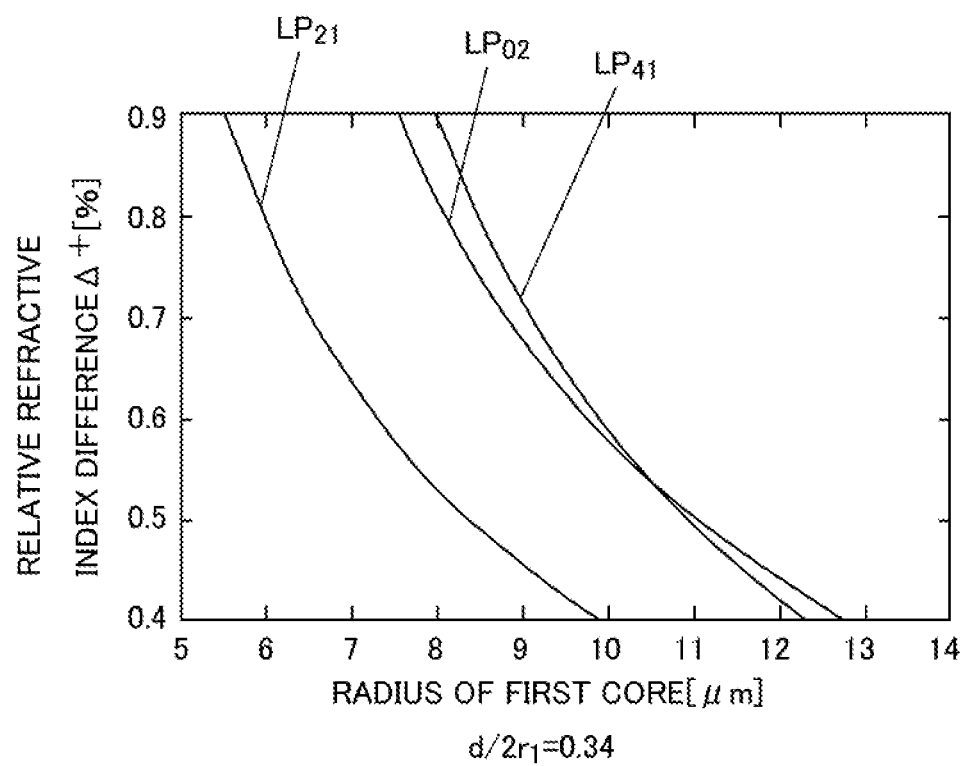
FIG. 6 is a diagram of the conditions in which in LP mode light beams are propagated through a first core in the case in which the ratio of the diameter of an inner core to the diameter of an outer core is 0.34.
Figure 7:
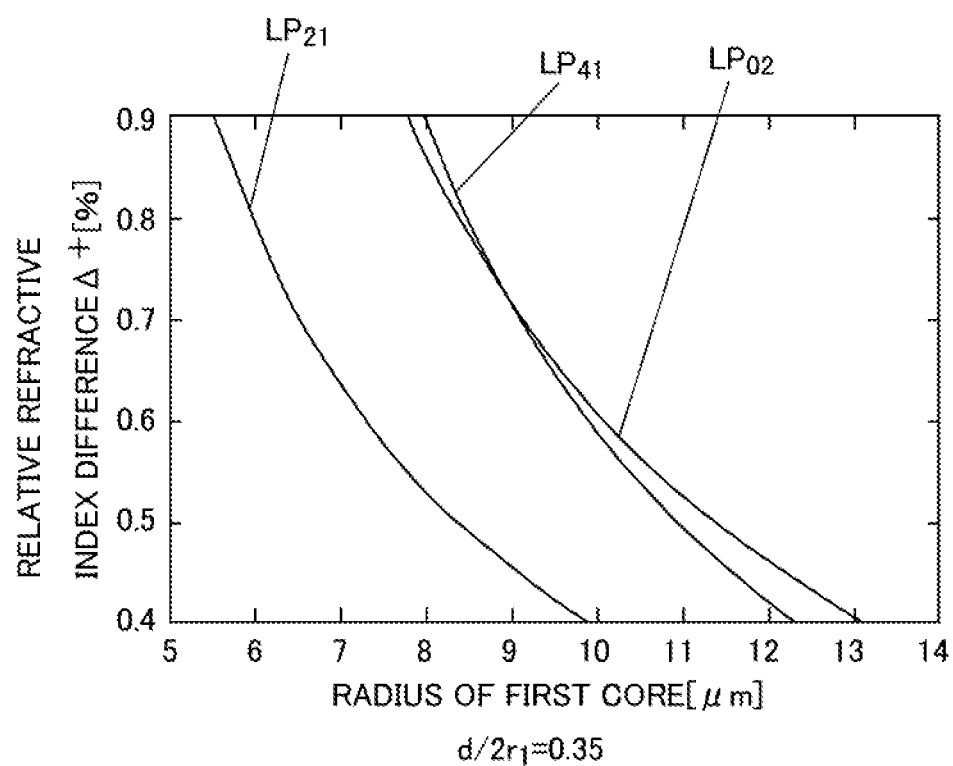
FIG. 7 is a diagram of the conditions in which in LP mode light beams are propagated through a first core in the case in which the ratio of the diameter of an inner core to the diameter of an outer core is 0.35.
Figure 8:
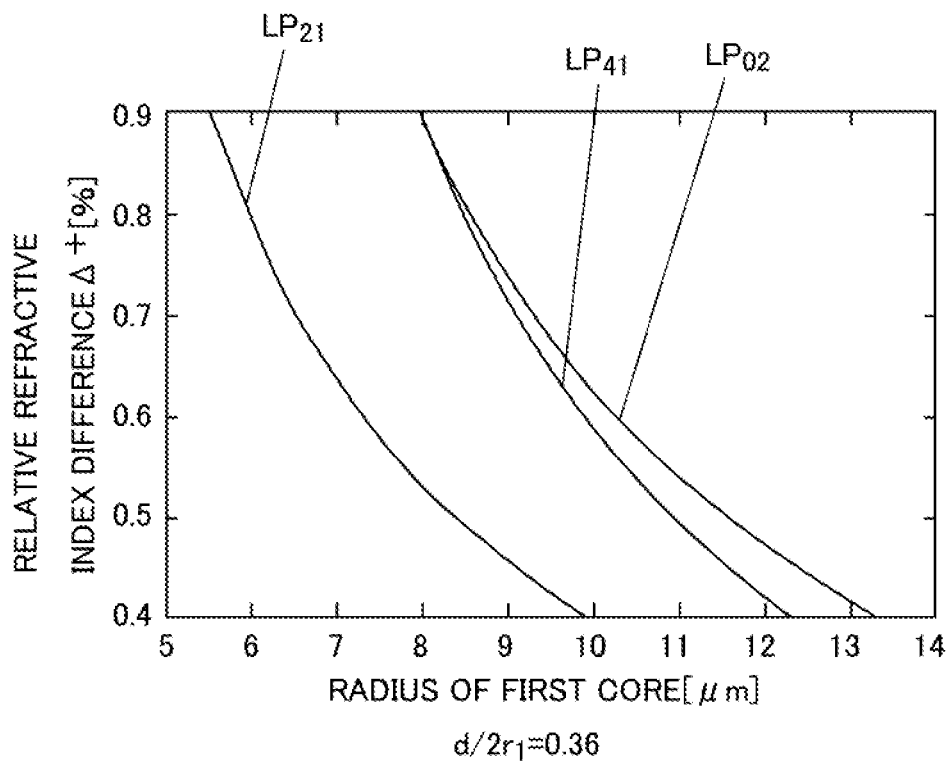
FIG. 8 is a diagram of the conditions in which in LP mode light beams are propagated through a first core in the case in which the ratio of the diameter of an inner core to the diameter of an outer core is 0.36.

In FIGS. 5 to 8, the vertical axis expresses the relative refractive index difference $\Delta^+$ of the outer core 11b to the cladding 20 and the horizontal axis expresses a radius $r_1$ of the first core. FIGS. 5 to 8 show the conditions in which when the wavelength is set to a wavelength of 1,550 nm, mode light beams are propagated through the first core 11. FIG. 5 shows a ratio $d/2r_1=0.33$, which is the ratio of the diameter d of the inner core 11a to the outer diameter of the outer core 11b (the diameter of the first core 11) $2r_1$. FIG. 6 shows the ratio $d/2r_1=0.34$. FIG. 7 shows the ratio $d/2r_1=0.35$. FIG. 8 shows the ratio $d/2r_1=0.36$.

In FIGS. 5 to 8, the case in which the relative refractive index difference $\Delta^+$ or the radius $r_1$ is smaller than the curves corresponding to the respective modes means that the corresponding mode light beams are propagated. The case in which the relative refractive index difference $\Delta^+$ or the radius $r_1$ is greater than the curves means that the propagation of the corresponding mode light beams is reduced. Note that, under the conditions in which the $LP_{21}$ mode light beam is propagated, the $LP_{01}$ mode and the $LP_{11}$ mode light beams are also propagated. In other words, in the region between the curve of the $LP_{21}$ mode light beam and the curve of the $LP_{02}$ mode or $LP_{41}$ mode light beam, the $LP_{01}$ mode, the $LP_{11}$ mode, and the $LP_{21}$ mode light beams are propagated, and the propagation of LP mode light beams higher than these modes is reduced.

From the viewpoint of reducing the inter-mode crosstalk in the core, the relative refractive index difference of the inner core 11a to the outer core 11b is preferably large. However, from the viewpoint of easily preparing a preform, the relative refractive index difference $\Delta^-$ of the inner core 11a to the cladding 20 was set to −0.7%, and the relative refractive index difference Δ⁺ of the outer core 11b to the cladding 20 was set to 0.9%.

In order to configure the first core 11 to propagate the $LP_{01}$ mode, the $LP_{11}$ mode, and the $LP_{21}$ mode light beams and to reduce the propagation of LP mode light beams higher than these modes, it is necessary to provide a configuration in which the $LP_{02}$ mode and the $LP_{41}$ mode light beams are cut off in the large-diameter portion 31 and the $LP_{21}$ mode light beam is propagated in the small-diameter portion 33. In other words, it is necessary that the radius $r_1$ of the first core in the large-diameter portion 31 be smaller than the curves of the $LP_{02}$ mode and the $LP_{41}$ mode light beams and the radius $r_1$ of the first core in the small-diameter portion 33 be greater than the curve of the $LP_{21}$ mode light beam. From the viewpoint of increasing the stretch ratio as much as possible, it is necessary to increase the difference between the radius $r_1$ of the first core in the large-diameter portion 31 and the radius $r_1$ of the first core in the small-diameter portion 33. Thus, the gap between the curve of the $LP_{21}$ mode light beam and the curves of the $LP_{02}$ mode and the $LP_{41}$ mode light beams is preferably large. Note that, the stretch ratio means the homothetic ratio of the small-diameter portion 33 to the large-diameter portion 31, which is the same value as the diameter of the multicore fiber in the large-diameter portion 31, where the diameter of the multicore fiber in the small-diameter portion 33 is one. From the comparison of FIGS. 5 to 8, in the case in which the relative refractive index difference Δ⁺ is 0.9%, the gap between the curve of the $LP_{21}$ mode light beam and the curves of the $LP_{02}$ mode and the $LP_{41}$ mode light beams is the largest in the ratio $d/2r_1=0.36$ in FIG. 8. It was revealed that in the ratio $d/2r_1=0.36$, it is fine that the radius $r_1$ of the first core in the large-diameter portion 31 is 7.91 μm. In this case, the stretch ratio can be about 1.45.

Design of Third Core

Mode multiplexing and demultiplexing is more easily taken place in the small-diameter portion 33, as a core pitch $\Lambda_3$ between the first core 11 and the third core 13 is smaller. However, the crosstalk is prone to be more increased in the large-diameter portion 31, as the core pitch $\Lambda_3$ between the first core 11 and the third core 13 is smaller. From these viewpoints, in Example 1, the core pitch $\Lambda_3$ between the first core 11 and the third core 13 was set to 20 μm.

Figure 9:
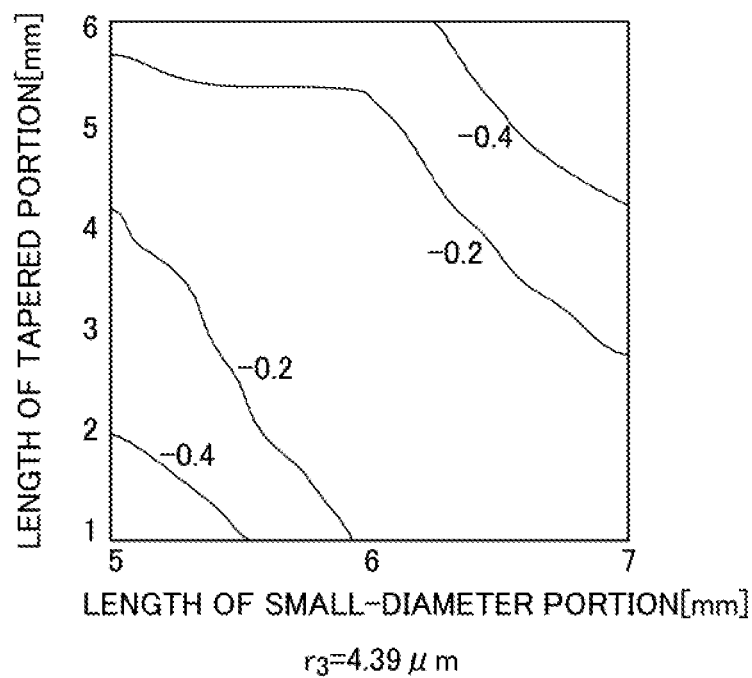
FIG. 9 is a diagram of a selection ratio in the $LP_{11}$ mode when the radius of a third core is 4.39 µm.
Figure 10:
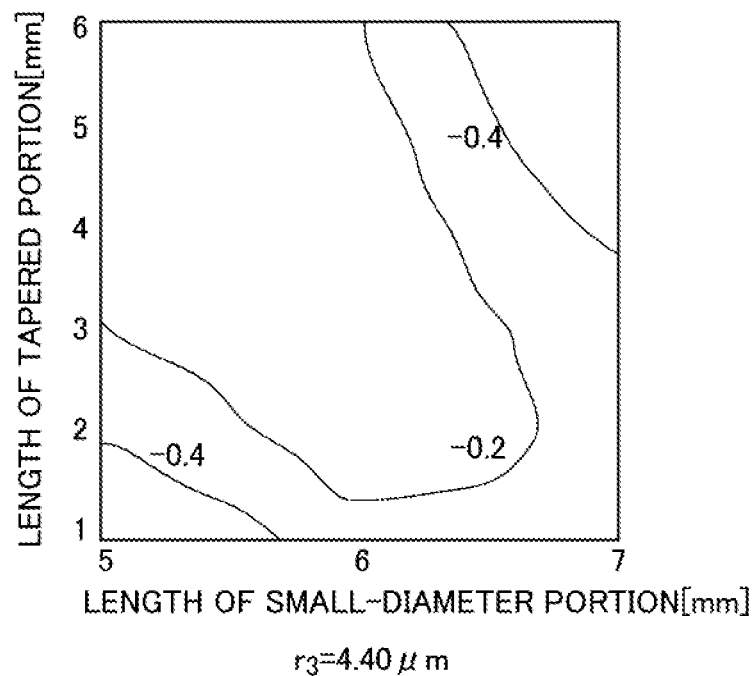
FIG. 10 is a diagram of a selection ratio in the $LP_{11}$ mode when the radius of a third core is 4.40 µm.
Figure 11:
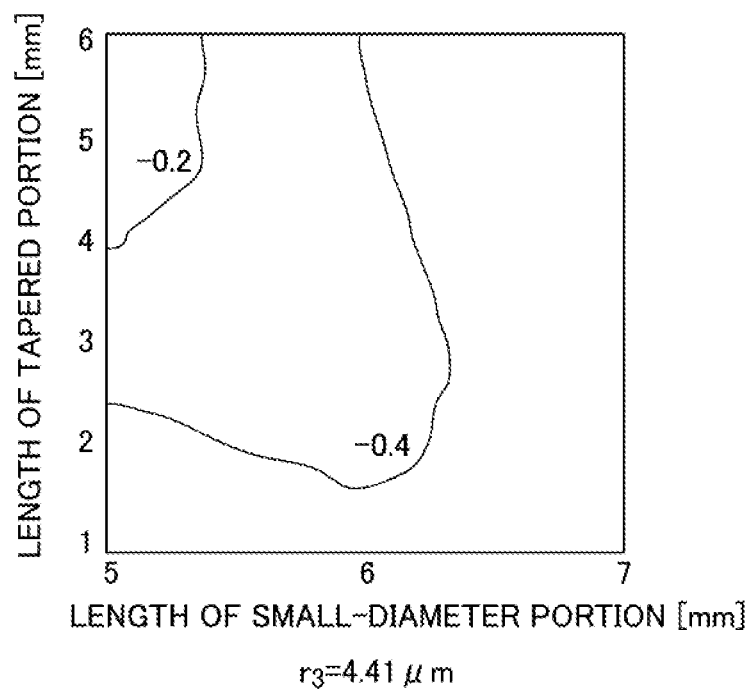
FIG. 11 is a diagram of a selection ratio in the $LP_{11}$ mode when the radius of a third core is 4.41 µm.

FIGS. 9 to 11 are results, in which it was supposed that the relative refractive index difference of the third core 13 to the cladding 20 was 0.8% at constant and a radius $r_3$ of the third core 13 was changed to calculate the selection ratio in the $LP_{11}$ mode [dB]. The mode selection ratio referred here means the ratio of the power of the $LP_{11}$ mode light beam emitted from the first core 11 to the power of the $LP_{01}$ mode light beam entered to the third core 13. FIG. 9 is a diagram of the selection ratio in the state in which the radius $r_3$ of the third core 13 is 4.39 μm. FIG. 10 is a diagram of the selection ratio in the state in which the radius $r_3$ of the third core 13 is 4.40 μm. FIG. 11 is a diagram of the selection ratio in the state in which the radius $r_3$ of the third core 13 is 4.41 μm. Note that, in FIGS. 9 to 11, the vertical axis expresses the length of the tapered portion 32, and the horizontal axis expresses the length of the small-diameter portion 33.

The evaluation of the selection ratio shows what extent of mode multiplexing and demultiplexing occurs between the first core and the third core. A higher selection ratio is better. FIGS. 9 to 11 show preferable cases in which the radius $r_3$ of the third core 13 is in a range of 4.39 to 4.40 μm, the length of the tapered portion 32 is in a range of 2 to 4 mm, and the length of the small-diameter portion 33 is 6 mm.

Design of Second Core

Figure 12:
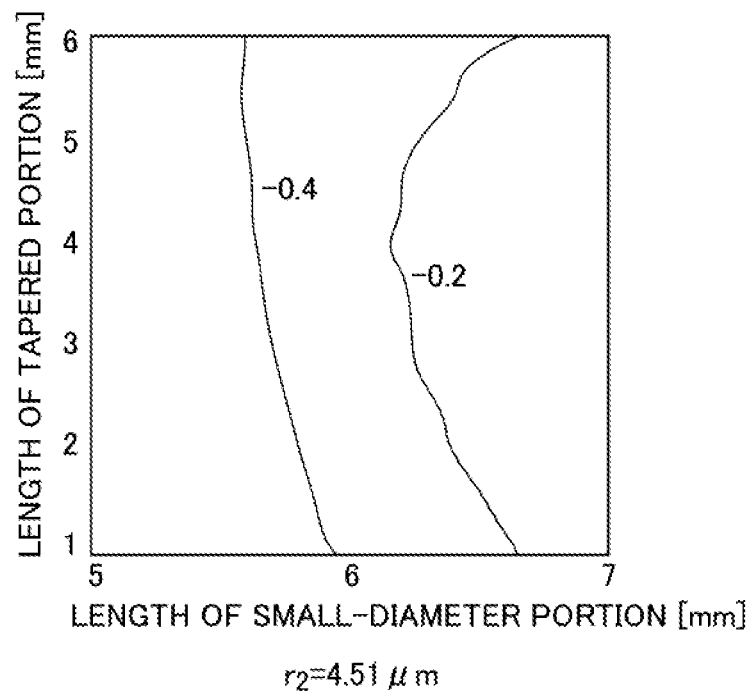
FIG. 12 is a diagram of a selection ratio in the $LP_{11}$ mode when the radius of a second core is 4.51 µm.
Figure 13:
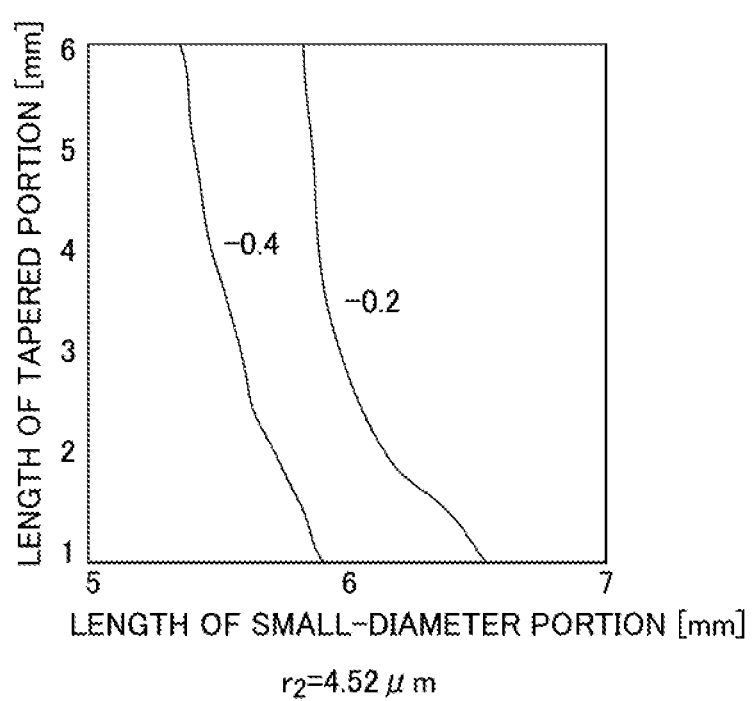
FIG. 13 is a diagram of a selection ratio in the $LP_{21}$ mode when the radius of a second core is 4.52 µm.
Figure 14:
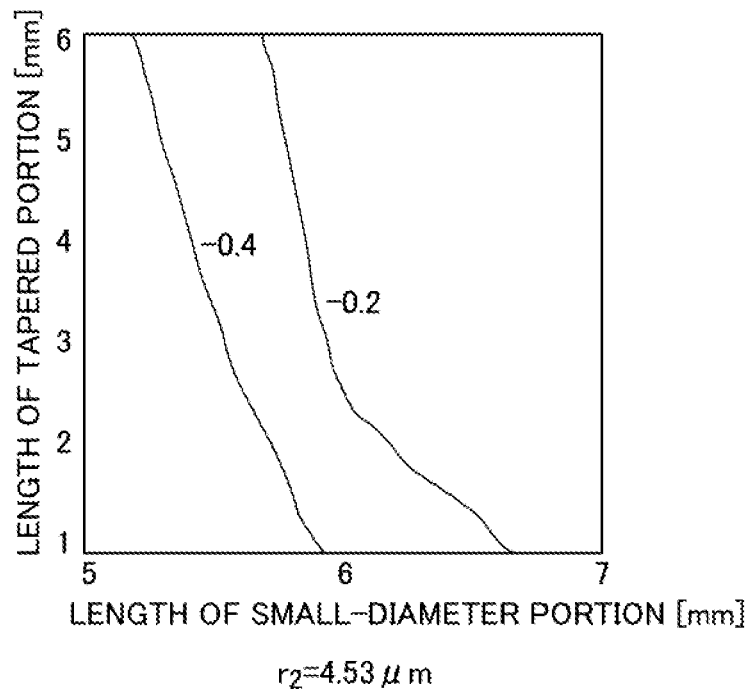
FIG. 14 is a diagram of a selection ratio in the $LP_{21}$ mode when the radius of a second core is 4.53 µm.

FIGS. 12 to 14 show the result, in which it was supposed that the relative refractive index difference of the second core 12 to the cladding 20 was 0.4% at constant, a core pitch $\Lambda_2$ between the first core 11 and the second core 12 was 23.5 μm, and a radius $r_2$ of the second core 12 was changed to calculate the selection ratio of the $LP_{21}$ mode [dB]. The selection ratio in this case means the ratio of the power of the $LP_{21}$ mode light beam emitted from the first core 11 to the power of the $LP_{01}$ mode light beam entered to the second core 12. FIG. 12 is a diagram of the selection ratio in the state in which the radius $r_2$ of the second core 12 is 4.51 μm. FIG. 13 is a diagram of the selection ratio in the state in which the radius $r_2$ of the second core 12 is 4.52 μm. FIG. 14 is a diagram of the selection ratio in the state in which the radius $r_2$ of the second core 12 is 4.53 μm. Note that, in FIGS. 12 to 14, the vertical axis expresses the length of the tapered portion 32, and the horizontal axis expresses the length of the small-diameter portion 33.

The evaluation of the selection ratio shows what extent of mode multiplexing and demultiplexing occurs between the first core and the second core. A higher selection ratio is better. Note that, as described above, in an appropriate design of the third core 13, the length of the tapered portion 32 is in a range of 2 to 4 mm, and the length of the small-diameter portion 33 is 6 mm. From the premise that the length of the tapered portion 32 is in a range of 2 to 4 mm and the length of the small-diameter portion 33 is 6 mm, FIGS. 12 to 14 show that the radius $r_2$ of the second core 12 is preferably in a range of 4.52 to 4.53 μm.

Figure 15:
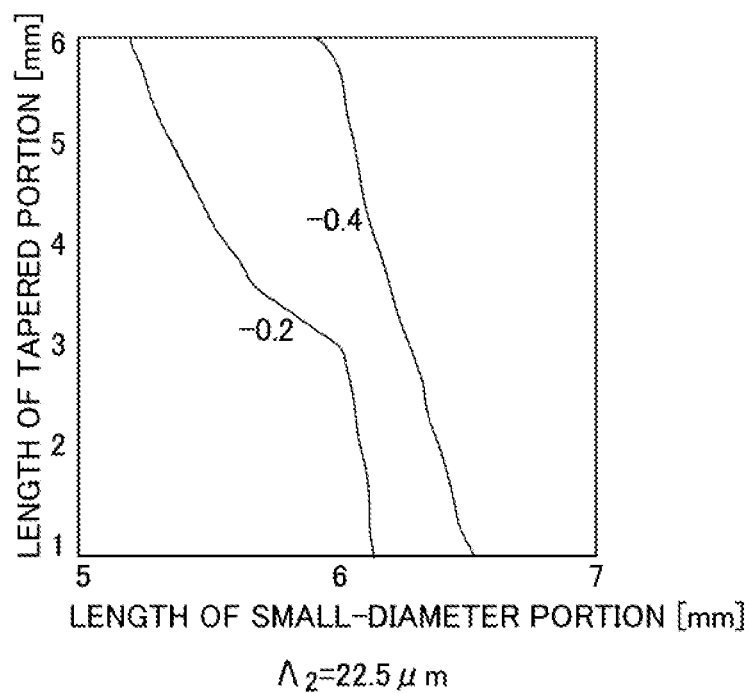
FIG. 15 is a diagram of a selection ratio in the $LP_{21}$ mode when a core pitch from a first core to a second core is 22.5 µm.
Figure 16:
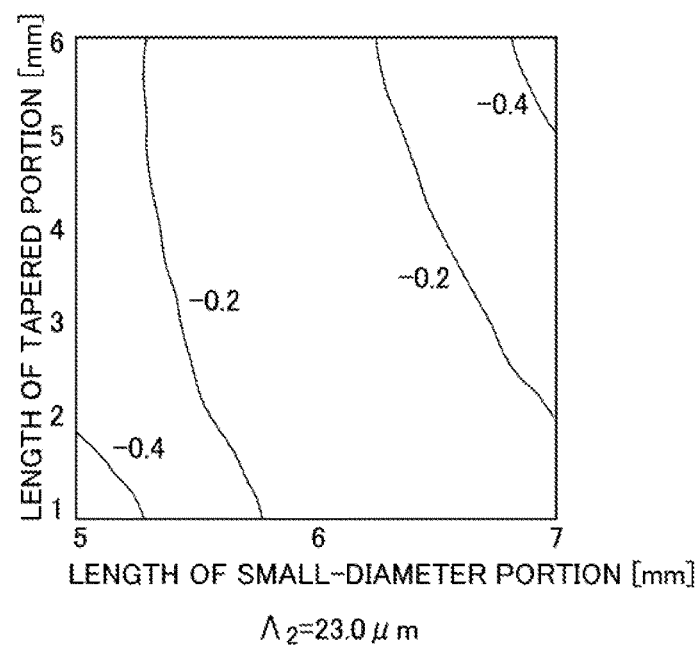
FIG. 16 is a diagram of a selection ratio in the $LP_{21}$ mode when a core pitch from a first core to a second core is 23.0 µm.

Next, FIGS. 15 and 16 are the result, in which the radius $r_2$ of the second core 12 was set to 4.52 μm, and the core pitch $\Lambda_2$ between the first core 11 and the second core 12 was changed to calculate the selection ratio of the $LP_{21}$ mode [dB]. FIG. 15 shows the case in which the core pitch $\Lambda_2$ between the first core 11 and the second core 12 is set to 22.5 μm. FIG. 16 is the case in which the core pitch $\Lambda_2$ between the first core 11 and the second core 12 is set to 23.0 μm. Compared with FIG. 13 in which the core pitch between the first core 11 and the second core 12 is 23.5 μm, as illustrated in FIG. 16, it is revealed that when the core pitch $\Lambda_2$ between the first core 11 and the second core 12 is set to 23.0 μm, the selection ratio is increased.

The optimum parameters obtained from the results investigated so far are shown in Table 1 and Table 2 below.

TABLE 1

| | First core | | | Second core | | | Third core | | |
|---|---|---|---|---|---|---|---|---|---|
| | Radius r1 in the large-diameter portion [μm] | $\Delta^+$ [%] | $\Delta^-$ [%] | Radius r2 in the large-diameter portion [μm] | $\Delta_2$ [%] | $\Lambda_2$ [μm] | Radius r3 in the large-diameter portion [μm] | $\Delta_3$ [%] | $\Lambda_3$ [μm] |
| | 7.91 | 0.9 | 0.7 | 4.52 | 0.4 | 23 | 4.4 | 0.8 | 20 |

TABLE 2

| Stretch ratio | Length of the tapered portion [mm] | Length of the small-diameter portion [mm] |
|---|---|---|
| 1.45 | 3 | 6 |

Example 2

Based on the results of the first embodiment, a multicore fiber corresponding to the multicore fiber 1 according to the first embodiment was prepared. It was confirmed whether mode multiplexing and demultiplexing was performed using the prepared multicore fiber 1.

The diameter of the multicore fiber 1 in the large-diameter portion 31 was 123.8 μm. The core pitch $\Lambda_2$ between the first core 11 and the second core 12 was 23.2 μm. The multicore fiber 1 was stretched so that the stretch ratio was 1.45, the length of the tapered portion 32 was 3 mm, and the length of the small-diameter portion 33 was 6 mm. The multicore fiber 1 was then prepared. Note that, the refractive indexes of the first core 11 and the second core 12 and the radius in the large-diameter portion 31 were as shown in Table 1.

It was enabled to confirm that the $LP_{01}$ mode light beam at a wavelength of 1,550 nm was entered to the second cores 12 of the prepared multicore fiber 1 and then the $LP_{21}$ mode light beam was emitted from the first core 11.

Figure 17:
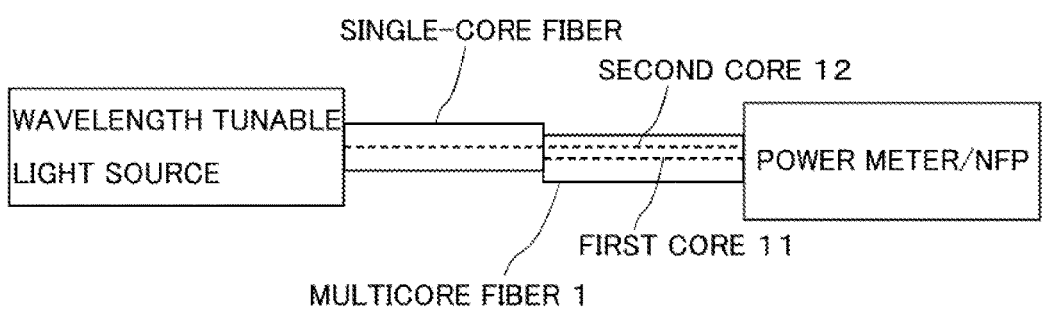
FIG. 17 is a diagram of a measurement system in measuring coupling efficiency in Example 2.
Figure 18:
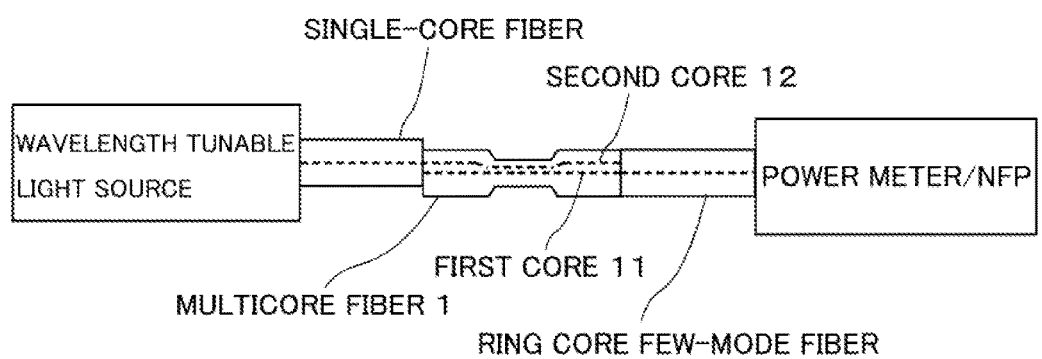
FIG. 18 is another diagram of a measurement system in measuring coupling efficiency in Example 2.
Figure 19:
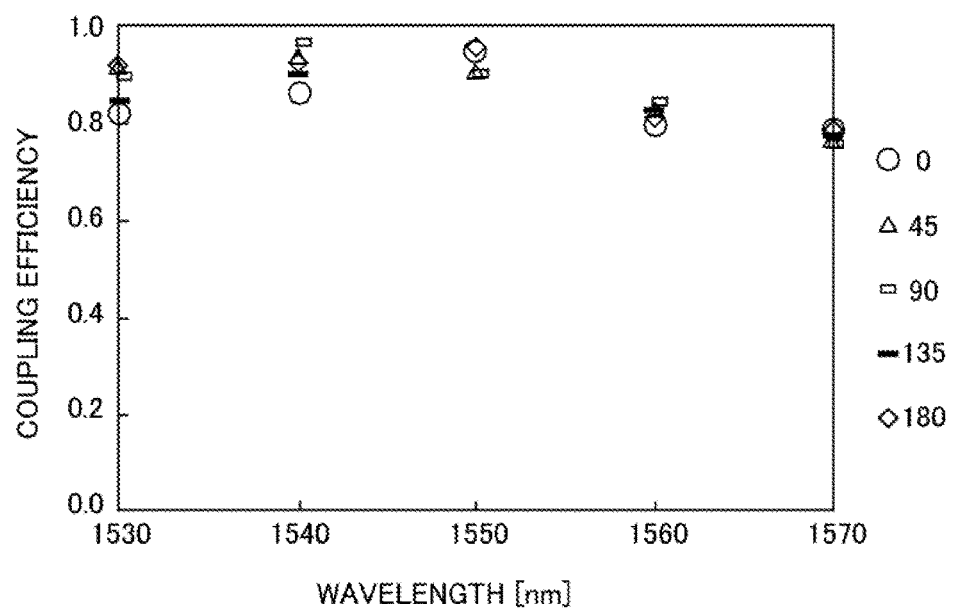
FIG. 19 is a diagram of the measured result of coupling efficiency performed in Example 2.

Next, coupling efficiency was measured. FIGS. 17 and 18 are schematic diagrams of a measurement system. FIG. 19 is the measured result. Note that, in FIGS. 17 and 18, broken lines express the positions of cores. For the second cores 12 of the multicore fiber 1, only the first one of the second cores 12 is shown.

First, as illustrated in FIG. 17, a light beam emitted from a wavelength tunable light source was entered to one end of the second cores 12 of the multicore fiber 1 before stretched through a single-core fiber, and the power of a light beam emitted from the other end of the second core 12 was measured using a power meter. The power is defined as $P_0$. As illustrated in FIG. 18, a light beam emitted from a wavelength tunable light source was entered to one end of the second cores 12 of the multicore fiber 1 after stretched through a single-core fiber, and the power of a light beam emitted from the other end of the first core 11 was measured through a ring index core few-mode fiber. The power is defined as $P_1$. In FIG. 19, the vertical axis (the coupling efficiency) expresses the ratio of the power $P_1$ to the power $P_0$, and the horizontal axis expresses the wavelength of the light beam emitted from the wavelength tunable light source. In FIG. 19, 0, 45, 90, 135, and 180 are angles of the half-wave plate of a polarization controller installed between the wavelength tunable light source and the single-core fiber.

FIG. 19 shows that it was confirmed that a coupling efficiency of about 80% or more is obtained in the entire C-band and the $LP_{01}$ mode light beam entered to the second core 12 is multiplexed as the $LP_{21}$ mode light beam on the first core 11. It was also confirmed that the dependence of coupling efficiency on the polarization angle is small.

The optical device according to the present invention is to implement a mode multiplexer/demultiplexer in which inter-center pitch is downsizable using a multicore fiber, which can be used in the industries of optical communications.

The invention claimed is:

1. A multicore fiber comprising:
    a first core configured to propagate an $LP_{01}$ mode light beam, an $LP_{11}$ mode light beam, and an $LP_{21}$ mode light beam; and
    a second core configured to propagate an $LP_{01}$ mode light beam, wherein
    a different mode interaction section is provided in which a propagation constant of the $LP_{21}$ mode light beam propagated through the first core is matched with a propagation constant of the $LP_{01}$ mode light beam propagated through the second core such that crosstalk occurs between the $LP_{21}$ mode light beam propagated through the first core and the $LP_{01}$ mode light beam propagated through the second core,
    a different mode non-interaction section is provided in which propagation constants of the LP mode light beams propagated through the first core are not matched with propagation constants of the LP mode light beams propagated through the second core,
    the first core includes an inner core and an outer core surrounding the inner core with no gap and having a refractive index higher than a refractive index of the inner core, and
    wherein the first core and the second core are separated from one another, from one longitudinal end of the multicore fiber to an opposite longitudinal end of the multicore fiber opposite to the one longitudinal end.

2. The multicore fiber according to claim 1, wherein two cores of the second cores are provided, and
    a first one of the second cores is disposed at a position overlapped with a first line segment extending from a center of the first core, and a second one of the second cores is disposed at a position overlapped with a second line segment crossing the first line segment at an angle of 135 degrees in the center of the first core.

3. The multicore fiber according to claim 1, further comprising
    a third core configured to propagate an $LP_{01}$ mode light beam, wherein
    in the different mode interaction section, the propagation constant of the $LP_{11}$ mode light beam propagated through the first core is matched with a propagation constant of an $LP_{01}$ mode light beam propagated through the third core, and
    in the different mode non-interaction section, the propa-gation constants of the LP mode light beams propagated through the first core are not matched with propagation constants of LP mode light beams propagated through the third core.

4. The multicore fiber according to claim 3, wherein two cores of the third core are provided, and
a first one of the third cores is disposed at a position overlapped with a third line segment extending from the center of the first core and a second one of the third cores is disposed at a position overlapped with a fourth line segment crossing the third line segment at an angle of 90 degrees in the center of the first core.

5. The multicore fiber according to claim 4, wherein two cores of the second core and two cores of the third core are provided,
a first one of the second cores is disposed at a position overlapped with a first line segment extending from a center of the first core, and a second one of the second cores is disposed at a position overlapped with a second line segment crossing the first line segment at an angle of 135 degrees in the center of the first core,
a first one of the third cores is disposed at a position overlapped with a third line segment extending from the center of the first core and a second one of the third cores is disposed at a position overlapped with a fourth line segment crossing the third line segment at an angle of 90 degrees in the center of the first core,
the first line segment crosses the third line segment at an angle of 67.5 degrees in the center of the first core, and
the second line segment crosses the fourth line segment at an angle of 67.5 degrees in the center of the first core.

6. The multicore fiber according to claim 1, further comprising
a third core configured to propagate an $LP_{01}$ mode light beam, wherein
the first core, the second core, and the third core are disposed at positions overlapped with one straight line so that the first core is disposed between the second core and the third core.

7. The multicore fiber according to claim 1, wherein the first core is located in a center of a cladding.

8. The multicore fiber according to claim 1, wherein the different mode interaction section is formed by stretching a part of the different mode non-interaction section.

9. The multicore fiber according to claim 1, wherein the number of LP mode light beams propagated through the first core, the second core, and the third core in a usable wavelength range is not changed I the different mode interaction section and in the different mode non-interaction section.

10. The multicore fiber according to claim 1, wherein a refractive index over an entire region between the outer core of the first core and the second core is constant.

11. The multicore fiber according to claim 10, further comprising a cladding surrounding the first core and the second core and residing between the first core and the second core, wherein a trench layer having a refractive index lower than a refractive index of the cladding is not formed around the first core.

* * * * *